(12) United States Patent
Park

(10) Patent No.: US 8,885,135 B2
(45) Date of Patent: Nov. 11, 2014

(54) NANOSTRUCTURE-FILM LCD DEVICES

(75) Inventor: Young-Bae Park, Arcadia, CA (US)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 1551 days.

(21) Appl. No.: 12/259,613

(22) Filed: Oct. 28, 2008

(65) Prior Publication Data

US 2009/0147167 A1 Jun. 11, 2009

Related U.S. Application Data

(60) Provisional application No. 60/983,537, filed on Oct. 29, 2007, provisional application No. 61/039,852, filed on Mar. 27, 2008.

(51) Int. Cl.
*G02F 1/1335* (2006.01)
*G02F 1/1343* (2006.01)

(52) U.S. Cl.
CPC ...... *G02F 1/134363* (2013.01); *G02F 2202/22* (2013.01); *G02F 1/133502* (2013.01); *G02F 1/133528* (2013.01)
USPC ........................................................ 349/155

(58) Field of Classification Search
USPC ........................................................ 349/155
See application file for complete search history.

(56) References Cited

U.S. PATENT DOCUMENTS

| | | | |
|---|---|---|---|
| 5,600,464 A | 2/1997 | Ohe et al. ................. 349/123 |
| 5,870,160 A | 2/1999 | Yanagawa et al. ......... 349/141 |
| 7,220,994 B2 | 5/2007 | Kim et al. ................... 257/72 |
| 7,262,501 B2 | 8/2007 | Duan et al. ................ 257/750 |
| 7,265,801 B2 | 9/2007 | Lin ............................ 349/99 |
| 2004/0253439 A1* | 12/2004 | Martin et al. .............. 428/339 |
| 2007/0070282 A1 | 3/2007 | Shibahara et al. ......... 349/141 |
| 2007/0070288 A1 | 3/2007 | Eun et al. |
| 2007/0160826 A1 | 7/2007 | Wang et al. ................ 428/331 |
| 2008/0317982 A1* | 12/2008 | Hecht et al. ............... 428/34.1 |
| 2010/0182524 A1* | 7/2010 | Nomura ..................... 349/40 |

FOREIGN PATENT DOCUMENTS

| | | |
|---|---|---|
| WO | WO2007/035794 | 3/2007 |
| WO | WO2007/061428 | 5/2007 |

OTHER PUBLICATIONS

PCT/US2008/81430 International Search Report (Dec. 31, 2008).
U.S. Appl. No. 10/431,963, entitled "Electronic Sensing of Biomolecular Processes," filed May 8, 2003.
Chinese Office Action issued Feb. 28, 2012 for corresponding Chinese Application No. 200880123304.

* cited by examiner

*Primary Examiner* — Phu Vu
(74) *Attorney, Agent, or Firm* — Harness, Dickey & Pierce, P.L.C.

(57) ABSTRACT

This invention relates to an LCD device comprising an electrically conductive and optically transparent nanostructure film deposited adjacent to or forming a part of at least one of a) a layer comprising triacetyl cellulose (TAC), b) a polarizing layer, c) an adhesive layer, d) a protective layer, e) an anti-glare layer f) an anti-reflective layer, or g) an antistatic layer. One embodiment is a device comprising an in plane switching (IPS) liquid crystal display (LCD) and a nanostructure film, wherein the film is electrically conductive, and wherein the film is optically transparent.

34 Claims, 7 Drawing Sheets

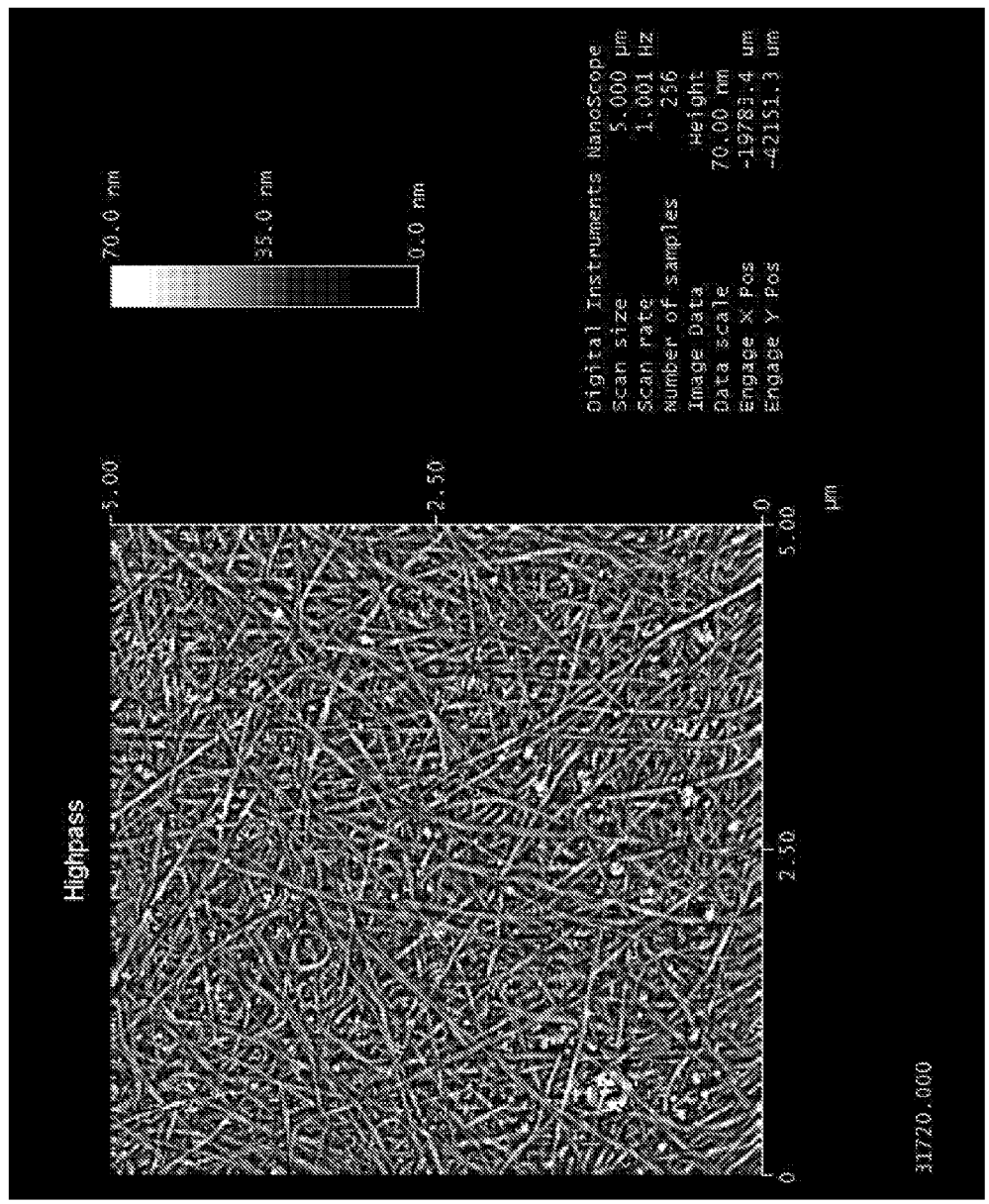

FIG. 5A

| Anti-reflective |
| --- |
| Anti-glare |
| TAC |
| Polarizing Layer |
| TAC |
| Adhesive |
| Protective Film |

FIG. 5B

| Protective Film |
| --- |
| Adhesive |
| TAC |
| Polarizing Layer |
| TAC |

NANOSTRUCTURE-FILM LCD DEVICES

CROSS-REFERENCES TO RELATED APPLICATIONS

This patent application claims priority from U.S. provisional application Ser. No. 60/983,537, filed Oct. 29, 2007, and Ser. No. 61/039,852, filed Mar. 27, 2008, which applications are incorporated herein by reference.

FIELD OF THE INVENTION

The present invention relates generally to nanostructure films, and more specifically to nanostructure films employed in display devices.

BACKGROUND OF THE INVENTION

Many modern and/or emerging applications require at least one device electrode that has not only high electrical conductivity, but high optical transparency as well. Such applications include, but are not limited to, touch screens (e.g., analog, resistive, 4-wire resistive, 5-wire resistive, surface capacitive, projected capacitive, multi-touch, etc.), displays (e.g., flexible, rigid, electro-phoretic, electro-luminescent, electro-chromatic, liquid crystal (LCD), plasma (PDP), organic light emitting diode (OLED), etc.), solar cells (e.g., silicon (amorphous, protocrystalline, nanocrystalline), cadmium telluride (CdTe), copper indium gallium selenide (CIGS), copper indium selenide (CIS), gallium arsenide (GaAs), light absorbing dyes, quantum dots, organic semiconductors (e.g., polymers, small-molecule compounds)), solid state lighting, fiber-optic communications (e.g., electro-optic and opto-electric modulators) and microfluidics (e.g., electrowetting on dielectric (EWOD)).

As used herein, a layer of material or a sequence of several layers of different materials is said to be "transparent" when the layer or layers permit at least 50% of the ambient electromagnetic radiation in relevant wavelengths to be transmitted through the layer or layers. Similarly, layers which permit some but less than 50% transmission of ambient electromagnetic radiation in relevant wavelengths are said to be "semi-transparent."

Currently, the most common transparent electrodes are transparent conducting oxides (TCOs), specifically indium-tin-oxide (ITO) on glass. However, ITO can be an inadequate solution for many of the above-mentioned applications (e.g., due to its relatively brittle nature, and correspondingly inferior flexibility and abrasion resistance, especially at low thicknesses), and the indium component of ITO is rapidly becoming a scarce commodity. Additionally, ITO deposition usually requires expensive, high-temperature sputtering, which can be incompatible with many device process flows. Hence, more robust, abundant and easily-deposited transparent conductor materials are being explored.

An in-plane switching (IPS) liquid crystal display (LCD) device is the one in which at least a pair of electrodes including a pixel electrode and a counter electrode are provided in a unit pixel on one or both of the transparent substrates, and the light passing through the liquid crystal layer is modulated by a field component generated between the pixel electrode and the counter electrode nearly in parallel with the surfaces of the liquid crystal layer. Such a device is described, for example, in U.S. Pat. No. 5,600,464 and U.S. Pat. No. 5,870,160, which are hereby incorporated by reference.

SUMMARY OF THE INVENTION

The present invention involves the use of nanostructure films in an in-plane switching (IPS) liquid crystal display (LCD) device. Nanostructures have attracted a great deal of recent attention due to their exceptional material properties. Nanostructures may include, but are not limited to, nanotubes (e.g., single-walled carbon nanotubes (SWNTs), multi-walled carbon nanotubes (MWNTs), double-walled carbon nanotubes (DWNTs), few-walled carbon nanotubes (FWNTs)), other fullerenes (e.g., buckyballs), graphene flakes/sheets, and/or nanowires (e.g., metallic (e.g., Ag, Ni, Pt, Au), semiconducting (e.g., InP, Si, GaN), dielectric (e.g., $SiO_2, TiO_2$), organic, inorganic). In one embodiment, nanostructure films may comprise at least one interpenetrating network of such nanostructures, and may similarly exhibit exceptional material properties. In another embodiment, a nanostructure film comprises at least one interconnected network of carbon nanotubes. In another embodiment, the nanostructures in the nanostructure film are in a medium, wherein the nanostructures are interconnected (e.g. the density of the nanostructures is above a percolation threshold in the medium). In another embodiment, a nanostructure film comprises at least one interconnected network of carbon nanotubes and can exhibit extraordinary strength and electrical conductivity, as well as efficient heat conduction and substantial optical transparency.

In one embodiment of the present invention, an LCD device comprises an electrically conductive and optically transparent nanostructure film deposited adjacent to or forming a part of at least one of a) a layer comprising triacetyl cellulose (TAC), b) a polarizing layer, c) an adhesive layer, d) a protective layer, e) an anti-glare layer f) an anti-reflective layer, or g) an antistatic layer. In another embodiment, the nanostructure film of the LCD device serves a shielding function against static electricity.

In another embodiment, a device comprises an in plane switching (IPS) liquid crystal display (LCD) and a nanostructure film, wherein the film is electrically conductive, and wherein the film is optically transparent. In another embodiment, the nanostructure film of the IPS LCD serves a shielding function against static electricity.

In another embodiment, the nanostructure film of the IPS LCD is on a surface of a transparent substrate. In another embodiment nanostructure film of the IPS LCD is between an upper polarizer plate and a transparent substrate or on one side of the upper polarizer plate, wherein the upper polarizer plate is at the viewed side of the LCD.

In another embodiment, the nanostructure film of the IPS LCD has a resistance of less than $2 \times 10^{14}$ ohms per square. In another embodiment, the nanostructure film of the IPS LCD has a resistance of less than $2 \times 10^8$ ohms per square. In another embodiment, the nanostructure film of the IPS LCD is embedded in an adhesive.

In another embodiment, the nanostructure film of the IPS LCD is patterned. In another embodiment, the nanostructure film of the IPS LCD comprises nanostructures, wherein the nanostructures are aligned. In another embodiment, the nanostructure film of the IPS LCD comprises nanostructures, wherein the nanostructures provide an optical polarizing effect.

In another embodiment, the upper polarizer plate of the IPS LCD comprises nanostructure film comprising nanostructures, wherein the nanostructures provide an optical polarizing effect.

In another embodiment, the device further comprises a pixel electrode and a counter electrode, wherein the pixel electrode, the counter electrode, or both, comprises nanostructure film.

In another embodiment, the nanostructure film of the IPS LCD further comprises a dopant. In a further embodiment, the dopant is selected from the group consisting of Iodine ($I_2$), Bromine ($Br_2$), polymer-supported Bromine ($Br_2$), Antimony pentafluoride ($SbF_5$), Phosphoruspentachloride ($PCl_5$), Vanadium oxytrifluoride ($VOF_3$), Silver(II)Fluoride ($AgF_2$), 2,1, 3-Benzoxadiazole-5-carboxylic acid, 2-(4-Biphenylyl)-5-phenyl-1,3,4-oxadiazole, 2,5-Bis-(4-aminophenyl)-1,3,4-oxadiazole, 2-(4-Bromophenyl)-5-phenyl-1,3,4-oxadiazole, 4-Chloro-7-chlorosulfonyl-2,1,3-benzoxadiazole, 2,5-Diphenyl-1,3,4-oxadiazole, 5-(4-Methoxyphenyl)-1,3,4-oxadiazole-2-thiol, 5-(4-Methylphenyl)-1,3,4-oxadiazole-2-thiol, 5-Phenyl-1,3,4-oxadiazole-2-thiol, 5-(4-Pyridyl)-1,3,4-oxadiazole-2-thiol, Methyl viologen dichloride hydrate, Fullerene-C60, N-Methylfulleropyrrolidine, N,N'-Bis(3-methylphenyl)-N,N'-diphenylbenzidine, Triethylamine (TEA), Triethanolanime (TEA)-OH, Trioctylamine, Triphenylphosphine, Trioctylphosphine, Triethylphosphine, Trinapthylphosphine, Tetradimethylaminoethene, Tris(diethylamino) phosphine, Pentacene, Tetracene, N,N'-Di-[(1-naphthyl)-N, N'-diphenyl]-1,1'-biphenyl)-4,4'-diamine sublimed grade, 4-(Diphenylamino)benzaldehyde, Di-p-tolylamine, 3-Methyldiphenylamine, Triphenylamine, Tris[4-(diethylamino) phenyl]amine, Tri-p-tolylamine, Acradine Orange base, 3,8-Diamino-6-phenylphenanthridine, 4-(Diphenylamino) benzaldehyde diphenylhydrazone, Poly(9-vinylcarbazole), Poly(1-vinylnaphthalene), Triphenylphosphine, 4-Carboxybutyl)triphenylphosphonium bromide, Tetrabutylammonium benzoate, Tetrabutylammonium hydroxide 30-hydrate, Tetrabutylammonium triiodide, Tetrabutylammonium bis-trifluoromethanesulfonimidate, Tetraethylammonium trifluoromethanesulfonate, Oleum ($H_2SO_4$—$SO_3$), Triflic acid and Magic Acid. In another embodiment, the dopant is covalently bonded to the film. In another embodiment, the dopant is non-covalently bonded to the film. In another embodiment, the dopant is bonded to the film in conjunction with a stabilizer. In another embodiment, the stabilizer is a Lewis acid and the dopant is a Lewis base. In another embodiment, the stabilizer is a Lewis base and the dopant is a Lewis acid. In another embodiment, the stabilizer is a molecule selected from the group consisting of poly(4-vinylpyridine) and triphenyl amine.

In yet another embodiment, the nanostructure film of the IPS LCD is coated with at least one encapsulation layer. In another embodiment, the encapsulation layer is a polymer selected from the group consisting of a fluoropolymer, an acrylic, a silane, a polyimide, a polyester and a polyvinylalkyl vinyl ether.

In another embodiment, the nanostructure film of the IPS LCD is coated film coated with two or more encapsulation layers. In another embodiment, the encapsulation layer is a polymer selected from the group consisting of a fluoropolymer, an acrylic, a silane, a polyimide, a polyester and a polyvinylalkyl vinyl ether.

In another embodiment, the nanostructure film of the IPS LCD comprises an application-specific additive. In another embodiment, the application specific additive is an infrared absorber or an ultraviolet absorber.

In another embodiment, the nanostructure film of the IPS LCD is on a transparent substrate, wherein the substrate is selected from the group consisting of a glass, an elastomer and a plastic. In another embodiment, the transparent substrate is an elastomer selected from the group consisting of saturated rubbers, unsaturated rubbers, thermoplastic elastomers (TPE), thermoplastic volcanizates (TPV), polyurethane rubber, polysulfide rubber, resilin and elastin. In another embodiment, the transparent substrate is a plastic selected from the group consisting of polymethyl methacrylate (PMMA), polyolefin, polyethylene terephthalate (PET), polyethylene naphthalate (PEN), polycarbonate (PC) and polyethersulfone (PES).

In another embodiment, the device comprising an IPS LCD and a nanostructure film further comprises a semiconducting element comprising nanostructure film.

In another embodiment, a liquid crystal display (LCD) device comprises a nanostructure film and an adhesive, wherein the adhesive permeates the film to form a nanostructure-adhesive composite, wherein the nanostructure-adhesive composite is optically transparent and electrically conductive. In another embodiment, the LCD device has a device architecture selected from the group consisting of twisted nematic (TN), vertical alignment (VA), multi-domain vertical alignment (MVA), and patterned vertical alignment (PVA).

In another embodiment, a LCD device comprises a nanostructure film wherein the nanostructure film is electrically conductive and optically transparent and wherein the LCD device has a device architecture selected from the group consisting of twisted nematic (TN), vertical alignment (VA), multi-domain vertical alignment (MVA), and patterned vertical alignment (PVA).

Other features and advantages of the invention will be apparent from the accompanying drawings and from the detailed description. One or more of the above-disclosed embodiments, in addition to certain alternatives, are provided in further detail below with reference to the attached figures. The invention is not limited to any particular embodiment disclosed; the present invention may be employed in not only transparent conductive film applications, but in other nanostructure applications as well (e.g., nontransparent electrodes, transistors, diodes, conductive composites, electrostatic shielding, etc.).

BRIEF DESCRIPTION OF THE DRAWINGS

The invention is better understood from reading the following detailed description of the preferred embodiments, with reference to the accompanying figures in which:

FIG. 1A is a scanning electron microscope (SEM) image of a nanostructure film according to one embodiment of the present invention;

FIGS. 5A and 5B depict exemplary top substrate and bottom substrate LCD device layers, respectively.

Features, elements, and aspects of the invention that are referenced by the same numerals in different figures represent the same, equivalent, or similar features, elements, or aspects in accordance with one or more embodiments of the system.

DETAILED DESCRIPTION OF THE EMBODIMENTS

In one embodiment, an electrically conductive and optically transparent nanostructure film, for example as described above, may be employed in an in-plane switching (IPS) LCD device to serve a shielding function against static electricity. The IPS LCD device may include a switching element, a pixel electrode and a counter electrode formed in a unit pixel over a first substrate of two substrates which are so disposed as to be opposed to each with a liquid crystal layer provided there between and at least one of the two substrates is transparent, and the light that passes through the liquid crystal layer is modulated with an electric field generated between the pixel electrode and the counter electrode substantially in parallel with the first substrate; wherein a black matrix having a resistivity of not smaller than $10^6$ ohm-cm is formed between the first substrate and the second substrate, and an electrically conductive and optically transparent nanostructure film is formed over the surface of the transparent substrate opposite to the liquid crystal layer at the viewed side, and is formed over a pixel-forming region. Where the nanostructure film is formed over the surface on the substrate of the side thereof opposite to the liquid crystal side, the electric field from the pixel electrode terminates not on the nanostructure film entirely but on the counter electrode, and so the electrically conductive layer does not adversely affect the quality of display, and even when a high potential such as produced by static electricity is applied from the outside of the liquid crystal display panel, the IPS LCD device may be prevented from becoming abnormal.

Figure 2A:
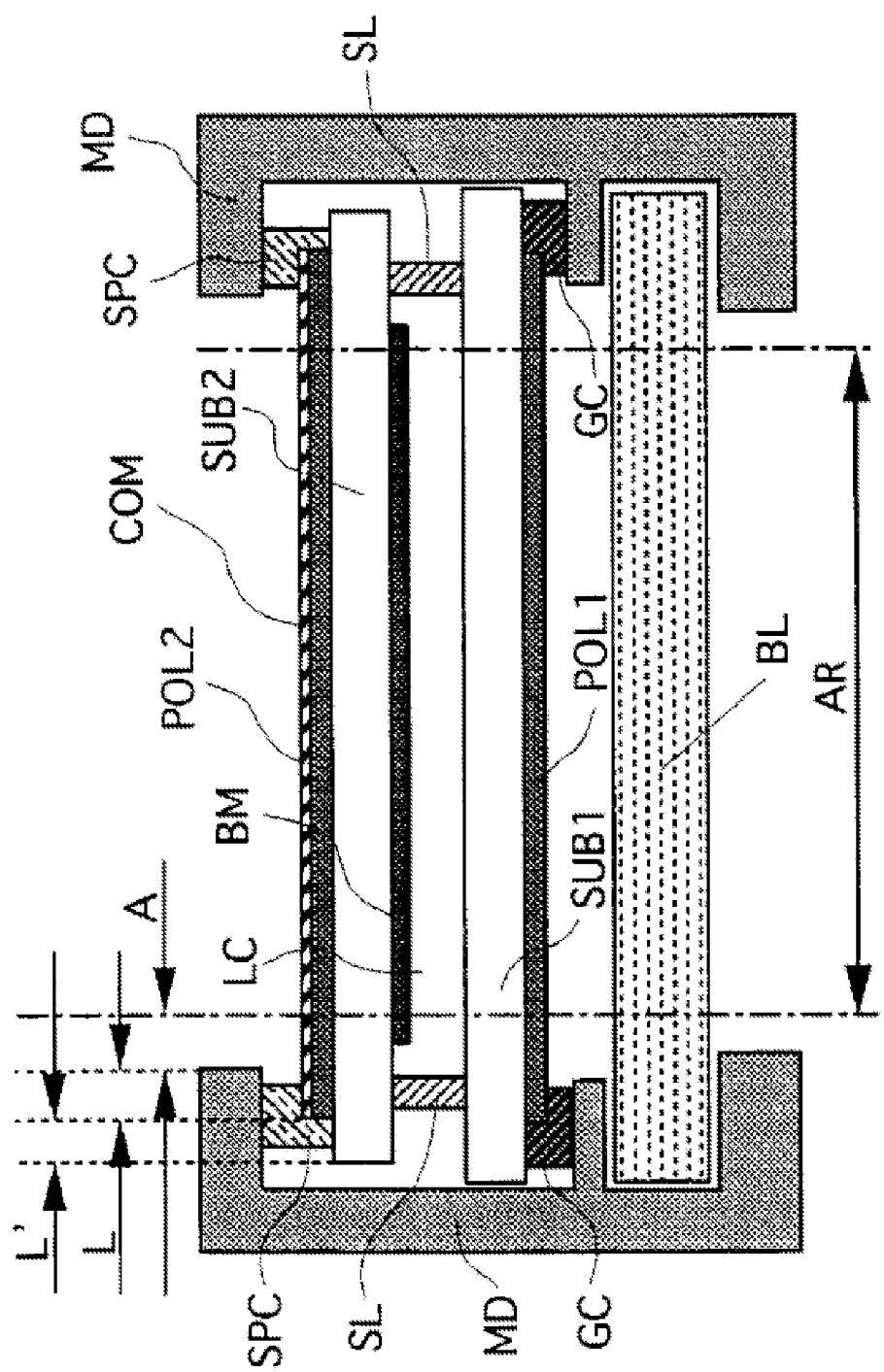
FIGS. 2A and 2B are sectional views illustrating, on an enlarged scale, portions of the periphery of an open region of a housing of two embodiments of the present invention.
Figure 2B:
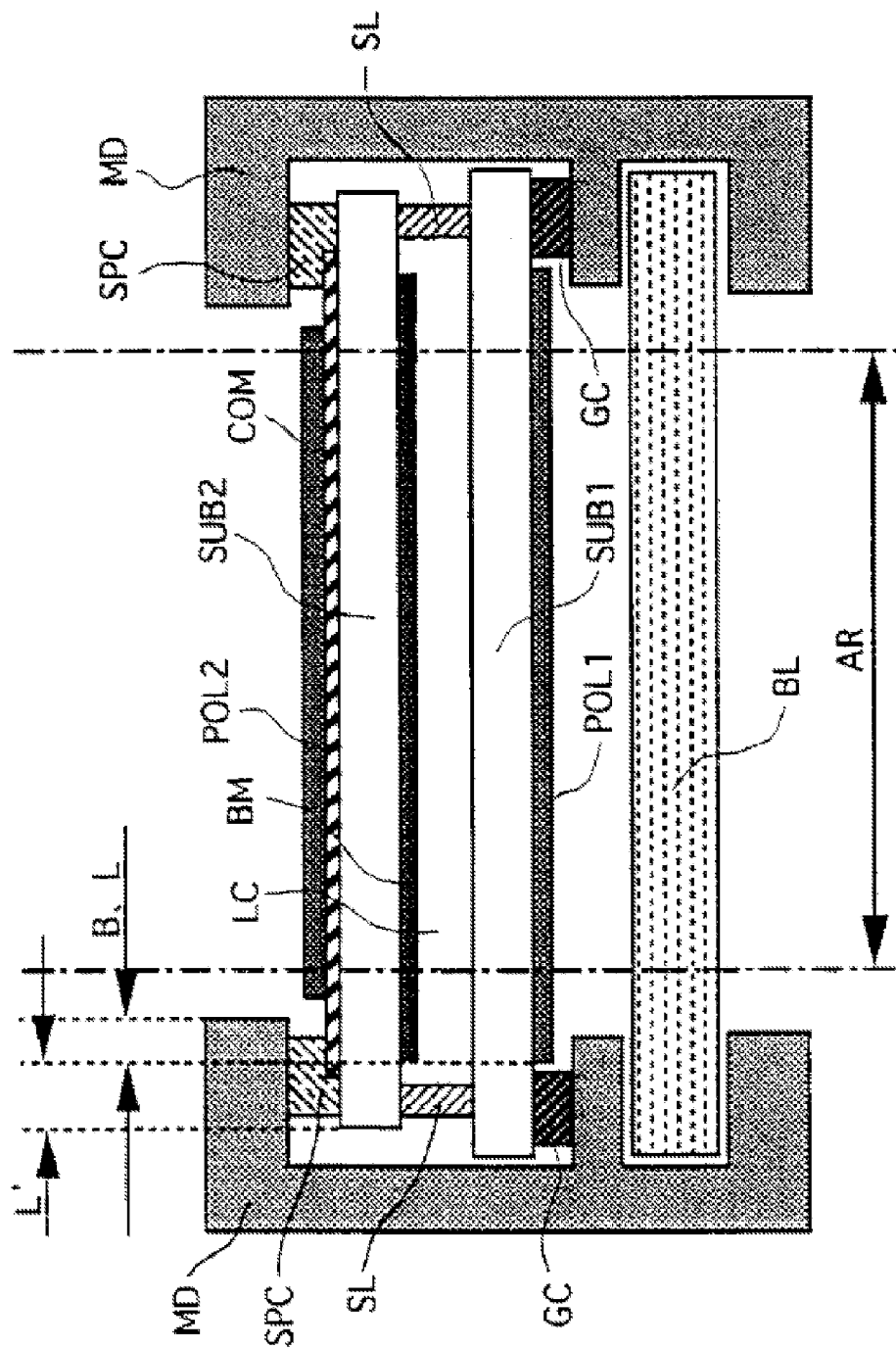

Referring to FIGS. 2A and 2B, an electrically conductive and optically transparent nanostructure film COM having a sheet resistance of less than $2\times10^{14}$ ohms per square or less than $10^8$ ohms per square may be formed inside the upper polarizer plate POL2, on the upper side, or on the lower side of the upper polarizer plate POL2. As compared to an ITO film, the nanostructure film may exhibit substantially greater mechanical robustness, especially given that extremely thin layers ITO (i.e., those providing sheet resistances of $2\times10^{14}$ ohms per square or $10^8$ ohms per square) are quite prone to cracking (especially during the display assembly process). As compared to a carbon black or other non-nanostructure carbon particles, the nanostructure film may exhibit substantially higher optical transparency, given that an interconnected network of nanostructures (e.g., carbon nanotubes) can provide the same electrical conductivity as a much higher loading of carbon black.

In one embodiment, the nanostructure film may be embedded in an adhesive to form a sticky layer between the polarizer plate POL2 and the upper substrate SUB2. This sticky layer may serve as a conductive adhesive binding the polarizer plate POL2 and the upper substrate SUB2. The nanostructures therein may be oriented (e.g., aligned), for example to provide or improve an optical polarizing effect. Additionally or alternatively, the nanostructure film may be patterned, for example as a grid.

In one embodiment, the polarizer plate POL2 may comprise a nanostructure film, and thereby itself be electrically conductive. For instance, the main surface of the polarizer plate POL2 may be coated with the nanostructure film, or the polarizer plate POL2 may be formed of a material comprising a nanostructure film. Additionally or alternatively, a nanostructure film may impart an electrical conductivity to any one of the layers constituting the polarizer plate POL2.

In one embodiment, the nanostructure film may comprise an interconnected network of nanostructures formed on a substrate (e.g., polyethylene terephthalate (PET)) and interposed between the polarizer plate POL2 and the upper substrate SUB2. This nanostructure film may be formed separately from the polarizer plate POL2, and/or may further be transferred to the polarizer plate POL2, for example from a donor substrate, laminate and/or release layer.

In another embodiment, the nanostructure film is formed as an electrically conductive and optically transparent film on nearly the whole region of the upper substrate SUB2 on the opposite side to the liquid crystal layer LC, and the polarizer plate POL2 is stuck onto the upper surface of the nanostructure film.

In one embodiment, other conductive elements of the IPS LCD device may comprise nanostructure films. For example, the pixel electrodes, counter electrodes, source electrodes and drain electrodes.

Referring to FIG. 1A, a nanostructure film according to one embodiment of the present invention comprises at least one interconnected network of single-walled carbon nanotubes (SWNTs). Such film may additionally or alternatively comprise other nanotubes (e.g., MWNTs, DWNTs), other fullerenes (e.g., buckyballs), graphene flakes/sheets, and/or nanowires (e.g., metallic (e.g., Ag, Ni, Pt, Au), semiconducting (e.g., InP, Si, GaN), dielectric (e.g., $SiO_2$, $TiO_2$), organic, inorganic).

Such nanostructure film may further comprise at least one functionalization material bonded to the nanostructure film. For example, a dopant bonded to the nanostructure film may increases the electrical conductivity of the film by increasing carrier concentration. Such dopant may comprise at least one of Iodine ($I_2$), Bromine ($Br_2$), polymer-supported Bromine ($Br_2$), Antimony pentafluoride ($SbF_5$), Phosphorus pentachloride ($PCl_5$), Vanadium oxytrifluoride ($VOF_3$), Silver (II)Fluoride ($AgF_2$), 2,1,3-Benzoxadiazole-5-carboxylic acid, 2-(4-Biphenylyl)-5-phenyl-1,3,4-oxadiazole, 2,5-Bis-(4-aminophenyl)-1,3,4-oxadiazole, 2-(4-Bromophenyl)-5-phenyl-1,3,4-oxadiazole, 4-Chloro-7-chlorosulfonyl-2,1,3-benzoxadiazole, 2,5-Diphenyl-1,3,4-oxadiazole, 5-(4-Methoxyphenyl)-1,3,4-oxadiazole-2-thiol, 5-(4-Methylphenyl)-1,3,4-oxadiazole-2-thiol, 5-Phenyl-1,3,4-oxadiazole-2-thiol, 5-(4-Pyridyl)-1,3,4-oxadiazole-2-thiol, Methyl viologen dichloride hydrate, Fullerene-C60, N-Methylfulleropyrrolidine, N,N'-Bis(3-methylphenyl)-N,N'-diphenylbenzidine, Triethylamine (TEA), Triethanolanime (TEA)-OH, Trioctylamine, Triphenylphosphine, Trioctylphosphine, Triethylphosphine, Trinapthylphosphine, Tetradimethylaminoethene, Tris(diethylamino)phosphine, Pentacene, Tetracene, N,N'-Di-[(1-naphthyl)-N,N'-diphenyl]-1,1'-biphenyl)-4,4'-diamine sublimed grade, 4-(Diphenylamino)benzaldehyde, Di-p-tolylamine, 3-Methyldiphenylamine, Triphenylamine, Tris[4-(diethylamino)phenyl]amine, Tri-p-tolylamine, Acradine Orange base, 3,8-Diamino-6-phenylphenanthridine, 4-(Diphenylamino) benzaldehyde diphenylhydrazone, Poly(9-vinylcarbazole), Poly(1-vinylnaphthalene), Triphenylphosphine, 4-Carboxybutyl)triphenylphosphonium bromide, Tetrabutylammonium benzoate, Tetrabutylammonium hydroxide 30-hydrate, Tetrabutylammonium triiodide, Tetrabutylammonium bis-trifluoromethanesulfonimidate, Tetraethylammonium trifluoromethanesulfonate, Oleum ($H_2SO_4$—$SO_3$), Triflic acid and/or Magic Acid.

Such dopant may be bonded covalently or noncovalently to the film. Moreover, the dopant may be bonded directly to the film or indirectly through and/or in conjunction with another molecule, such as a stabilizer that reduces desorption of dopant from the film. The stabilizer may be a relatively weak reducer (electron donor) or oxidizer (electron acceptor), where the dopant is a relatively strong reducer (electron donor) or oxidizer (electron acceptor) (i.e., the dopant has a greater doping potential than the stabilizer). Additionally or alternatively, the stabilizer and dopant may comprise a Lewis base and Lewis acid, respectively, or a Lewis acid and Lewis base, respectively. Exemplary stabilizers include, but are not limited to, aromatic amines, other aromatic compounds, other amines, imines, trizenes, boranes, other boron-containing compounds and polymers of the preceding compounds. Specifically, poly(4-vinylpyridine) and/or tri-phenyl amine have displayed substantial stabilizing behavior in accelerated atmospheric testing (e.g., 1000 hours at 65° C. and 90% relative humidity).

Stabilization of a dopant bonded to a nanostructure film may also or alternatively be enhanced through use of an encapsulant. The stability of a non-functionalized or otherwise functionalized nanostructure film may also be enhanced through use of an encapsulant. Accordingly, yet another embodiment of the present invention comprises a nanostructure film coated with at least one encapsulation layer. This encapsulation layer preferably provides increased stability and environmental (e.g., heat, humidity and/or atmospheric gases) resistance. Multiple encapsulation layers (e.g., having different compositions) may be advantageous in tailoring encapsulant properties. Exemplary encapsulants comprise at least one of a fluoropolymer, acrylic, silane, polyimide and/or polyester encapsulant (e.g., PVDF (Hylar CN from Solvay), Teflon AF, Polyvinyl fluoride (PVF), Polychlorotrifluoroethylene (PCTFE), Polyvinylalkyl vinyl ether, Fluoropolymer dispersion from Dupont (TE 7224), Melamine/Acrylic blends, conformal acrylic coating dispersion, etc.). Encapsulants may additionally or alternatively comprise UV and/or heat cross-linkable polymers (e.g., Poly(4-vinyl-phenol)).

A nanostructure film according to one embodiment may also comprise application-specific additives. For example, thin nanotube films can be inherently transparent to infrared radiation, thus it may be advantageous to add an infrared (IR) absorber thereto to change this material property (e.g., for window shielding applications). Exemplary IR absorbers include, but are not limited to, at least one of a cyanine, quinone, metal complex, and photochronic. Similarly, UV absorbers may be employed to limit the nanostructure film's level of direct UV exposure.

A nanostructure film according to one embodiment may be fabricated using solution-based processes. In such processes, nanostructures may be initially dispersed in a solution with a solvent and dispersion agent. Exemplary solvents include, but are not limited to, deionized (DI) water, alcohols and/or benzo-solvents (e.g., toluene, xylene). Exemplary dispersion agents include, but are not limited to, surfactants (e.g., sodium dodecyl sulfate (SDS), Triton X, NaDDBS) and biopolymers (e.g., carboxymethylcellulose (CMC)). Dispersion may be further aided by mechanical agitation, such as by cavitation (e.g., using probe and/or bath sonicators), shear (e.g., using a high-shear mixer and/or rotor-stator), impingement (e.g., rotor-stator) and/or homogenization (e.g., using a homogenizer). Coating aids may also be employed in the solution to attain desired coating parameters, e.g., wetting and adhesion to a given substrate; additionally or alternatively, coating aids may be applied to the substrate. Exemplary coating aids include, but are not limited to, aerosol OT, fluorinated surfactants (e.g., Zonyl FS300, FS500, FS62A), alcohols (e.g., hexanol, heptanol, octanol, nonanol, decanol, undecanol, dodecanol, saponin, ethanol, propanol, butanol and/or pentanol), aliphatic amines (e.g., primary, secondary (e.g., dodecylamine), tertiary (e.g., triethanolamine), quartinary), TX-100, FT248, Tergitol TMN-10, Olin 10G and/or APG325.

The resulting dispersion may be coated onto a substrate using a variety of coating methods. Coating may entail a single or multiple passes, depending on the dispersion properties, substrate properties and/or desired nanostructure film properties. Exemplary coating methods include, but are not limited to, spray-coating, dip-coating, drop-coating and/or casting, roll-coating, transfer-stamping, slot-die coating, curtain coating, [micro]gravure printing, flexoprinting and/or inkjet printing. Exemplary substrates may be flexible or rigid, and include, but are not limited to, glass, elastomers (e.g., saturated rubbers, unsaturated rubbers, thermoplastic elastomers (TPE), thermoplastic vulcanizates (TPV), polyurethane rubber, polysulfide rubber, resilin and/or elastin) and/or plastics (e.g., polymethyl methacrylate (PMMA), polyolefin, polyethylene terephthalate (PET), polyethylene naphthalate (PEN), polycarbonate (PC) and/or polyethersulfone (PES)). Flexible substrates may be advantageous in having compatibility with roll-to-roll (a.k.a. reel-to-reel) processing, wherein one roll supports uncoated substrate while another roll supports coated substrate. As compared to a batch process, which handles only one component at a time, a roll-to-roll process represents a dramatic deviation from current manufacturing practices, and can reduce capital equipment and product costs, while significantly increasing throughput.

Once coated onto a substrate, the dispersion may be heated to remove solvent therefrom, such that a nanostructure film is formed on the substrate. Exemplary heating devices include a hot plate, heating rod, heating coil and/or oven. The resulting film may be subsequently washed (e.g., with water, ethanol and/or IPA) and/or oxidized (e.g., baked and/or rinsed with an oxidizer such as nitric acid, sulfuric acid and/or hydrochloric acid) to remove residual dispersion agent and/or coating aid therefrom.

Dopant, other additives and/or encapsulant may further be added to the film. Such materials may be applied to the nanostructures in the film before, during and/or after film formation, and may, depending on the specific material, be applied in gas, solid and/or liquid phase (e.g., gas phase $NO_2$ or liquid phase nitric acid ($HNO_3$) dopants). Such materials may moreover be applied through controlled techniques, such as the coating techniques enumerated above in the case of liquid phase materials (e.g., slot-die coating a polymer encapsulant).

A nanostructure film according to one embodiment may be patterned before (e.g., using lift-off methods, pattern-pre-treated substrate), during (e.g., patterned transfer printing, inkjet printing) and/or after (e.g., using laser ablation or masking/etching techniques) fabrication on a substrate.

In one exemplary embodiment, an optically transparent and electrically conductive nanostructure film comprising an interconnected network of SWNTs was fabricated on a transparent and flexible plastic substrate via a multi-step spray and wash process. A SWNT dispersion was initially formulated by dissolving commercially-available SWNT powder (e.g., P3 from Carbon Solutions) in DI water with 1% SDS, and probe sonicated for 30 minutes at 300 W power. The resulting dispersion was then centrifuged at 10k rcf (relative centrifugal field) for 1 hour, to remove large agglomerations of SWNTs and impurities (e.g., amorphous carbon and/or residual catalyst particles). In parallel, a PC substrate was immersed in a silane solution (a coating aid comprising 1% weight of 3-aminopropyltriethoxysilane in DI water) for approximately five minutes, followed by rinsing with DI water and blow drying with nitrogen. The resulting pre-treated PC substrate (Tekra 0.03" thick with hard coating) was then spray-coated over a 100° C. hot plate with the previously-prepared SWNT dispersion, immersed in DI water for 1 minute, then sprayed again, and immersed in DI water again. This process of spraying and immersing in water may be repeated multiple times until a desired sheet resistance (e.g., film thickness) is achieved.

In a related exemplary embodiment, a doped nanostructure film comprising an interconnected network of SWNTs was fabricated on a transparent and flexible substrate using the methods described in the previous example, but with a SWNT dispersion additionally containing a $TCNQF_4$ (7,7,8,8-tetra-cyanoperfluoro-p-quinodimethane) dopant. In another related embodiment, this doped nanostructure film was subsequently encapsulated by spin-coating a layer of parylene thereon and baking.

In another exemplary embodiment, a SWNT dispersion was first prepared by dissolving SWNT powder (e.g., P3 from Carbon Solutions) in DI water with 1% SDS and bath-sonicated for 16 hours at 100 W, then centrifuged at 15000 rcf for 30 minutes such that only the top ¾ portion of the centrifuged dispersion is selected for further processing. The resulting dispersion was then vacuum filtered through an alumina filter with a pore size of 0.1-0.2 μm (Whatman Inc.), such that an optically transparent and electrically conductive SWNT film is formed on the filter. DI water was subsequently vacuum filtered through the film for several minutes to remove SDS. The resulting film was then transferred to a PET substrate by a PDMS (poly-dimethylsiloxane) based transfer printing technique, wherein a patterned PDMS stamp is first placed in conformal contact with the film on the filter such that a patterned film is transferred from the filter to the stamp, and then placed in conformal contact with the PET substrate and heated to 80° C. such that the patterned film is transferred to the PET. In a related exemplary embodiment, this patterned film may be subsequently doped via immersion in a gaseous $NO_2$ chamber. In another related exemplary embodiment, the film is encapsulated by a layer of PmPV (Poly[(m-phenyle-nevinylene)-co-(2,5-dioctoxy-p-phenylenevinylene)]) which, in the case of a doped film, can reduce desorption of dopant from the film.

In yet another exemplary embodiment, an optically transparent, electrically conductive, doped and encapsulated nanostructure film comprising an interconnected network of FWNTs was fabricated on a transparent and flexible substrate. FWNTs (OE grade from Unidym, Inc.) grown by a chemical vapor deposition (CVD) process were first dissolved in DI water with 0.5% Triton-X, and probe sonicated for one hour at 300 W power. The resulting dispersion was then slot-die coated onto a PET substrate, and baked at about 100° C. to evaporate the solvent. The Triton-X was subsequently removed from the resulting FWNT film by immersing the film for about 15-20 seconds in nitric acid (10 molar). Nitric acid may be effective as both an oxidizing agent for surfactant removal, and a doping agent as well, improving the sheet resistance of the film from 498 ohms/sq to about 131 ohms/sq at about 75% transparency, and 920 ohms/sq to about 230 ohms/sq at 80% transparency in exemplary films. In related exemplary embodiments, these films were subsequently coated with triphenylamine which stabilized the dopant (i.e., the film exhibited a less than 10% change in conductivity after 1000 hours under accelerated aging conditions (65° C.)). In other related exemplary embodiments, the films were then encapsulated with Teflon AF.

In another exemplary embodiment, FWNT powder was initially dispersed in water with SDS (e.g., 1%) surfactant by sonication (e.g., bath sonication for 30 minutes, followed by probe sonication for 30 minutes); 1-dodecanol (e.g., 0.4%) was subsequently added to the dispersion by sonication (e.g., probe sonication for 5 minutes) as a coating aid, and the resulting dispersion was Meyer rod coated onto a PEN substrate. SDS was then removed by rinsing the film with DI water, and the 1-dodecanol was removed by rinsing with ethanol. This resulting optically transparent and electrically conductive film passed an industry-standard "tape test," (i.e., the FWNT film remained on the substrate when a piece of Scotch tape was pressed onto and then peeled off of the film); such adhesion between the FWNT film and PEN was not achieved with SDS dispersions absent use of a coating aid.

In one embodiment, an electrically conductive and optically transparent nanostructure film, for example as described above, may be employed in an in-plane switching (IPS) LCD device to serve a shielding function against static electricity (i.e., the film has a sheet resistance of less than about 10,000 ohms/sq). The IPS LCD device may include a switching element, a pixel electrode and a counter electrode formed in a unit pixel over a first substrate of two substrates which are so disposed as to be opposed to each with a liquid crystal layer provided there between and at least one of the two substrates is transparent, and the light that passes through the liquid crystal layer is modulated with an electric field generated between the pixel electrode and the counter electrode substantially in parallel with the first substrate; wherein a black matrix having a resistivity of not smaller than $10^6$ ohm-cm is formed between the first substrate and the second substrate, and an electrically conductive and optically transparent nanostructure film is formed over the surface of the transparent substrate opposite to the liquid crystal layer at the viewed side, and is formed over a pixel-forming region. Where the nanostructure film is formed over the surface on the substrate of the side thereof opposite to the liquid crystal side, the electric field from the pixel electrode terminates not on the nanostructure film entirely but on the counter electrode, and so the electrically conductive layer does not adversely affect the quality of display, and even when a high potential such as produced by static electricity is applied from the outside of the liquid crystal display panel, the IPS LCD device may be prevented from becoming abnormal.

Referring to FIGS. 2A and 2B, an electrically conductive and optically transparent nanostructure film COM having a sheet resistance of less than $2 \times 10^{14}$ ohm/square or less than $10^8$ ohm/square may be formed inside the upper polarizer plate POL2, on the upper side, or on the lower side of the upper polarizer plate POL2. The nanostructure film COM may be electrically connected to a shielding case of the housing MD using an electrically conductive spacer SPC having a sheet resistance of not larger than $10^8$ ohm per square. The spacer SPC may be coated with an electrically conductive sticky material (e.g., comprising a nanostructure film) on both surfaces thereof. After being stuck to a shielding case, the spacer SPC may be pressed and secured when it is assembled together with a lower case by using pawls and hooks provided on the shielding case. The shielding case of the housing MD may be connected to a frame ground of a driver circuit substrate, and may be connected to ground potential via an interface connector terminal. Owing to this structure, static electricity from outside the IPS LCD device may diffuse in the nanostructure film COM and flow, through the spacer SPC, into the shielding case of the housing MD, and therefore, the quality of display may not be deteriorated by the static electricity.

Figure 3A:
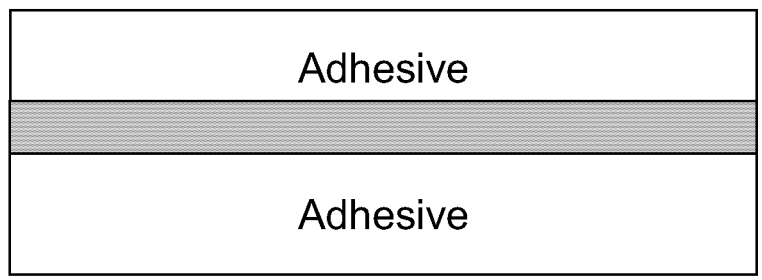
FIGS. 3A, 3B and 3C are sectional views illustrating, on an enlarged scale, portions of a nanostructure film layer according to one embodiment of the present invention, wherein the nanostructure film may be embedded in an adhesive and may perform a shielding function against static electricity.
Figure 3B:
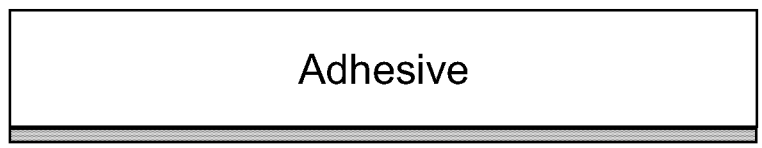
Figure 3C:
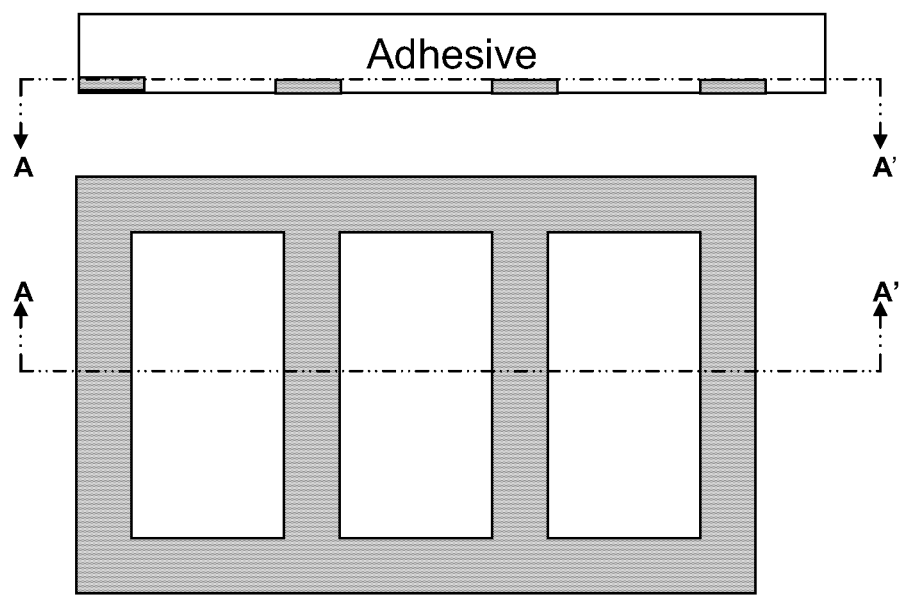

Referring to FIGS. 3A, 3B and 3C, the nanostructure film COM may be embedded in an adhesive to form a sticky layer between the polarizer plate POL2 and the upper substrate SUB2 (see also FIG. 2B). This sticky layer may serve as a conductive adhesive binding the polarizer plate POL2 and the upper substrate SUB2. The nanostructures therein may be random or may be oriented (e.g., aligned to provide or improve an optical polarizing effect). Additionally or alternatively, the nanostructure film may be patterned, for example as a grid (see FIG. 3C). A grid pattern may be advantageous where, for example, grid members are positioned between pixels (e.g., RGB) to allow for greater optical transmission through the device (i.e., where areas overlying pixels are not fully covered by the nanostructure film). Such pattern may be formed before (e.g., using lift-off techniques), during (e.g., using a patterned transfer stamp, inkjet printing, flexoprinting and/or gravure printing) and/or after (e.g., using laser ablation or lithography and etching) nanostructure film formation.

Figure 1B:
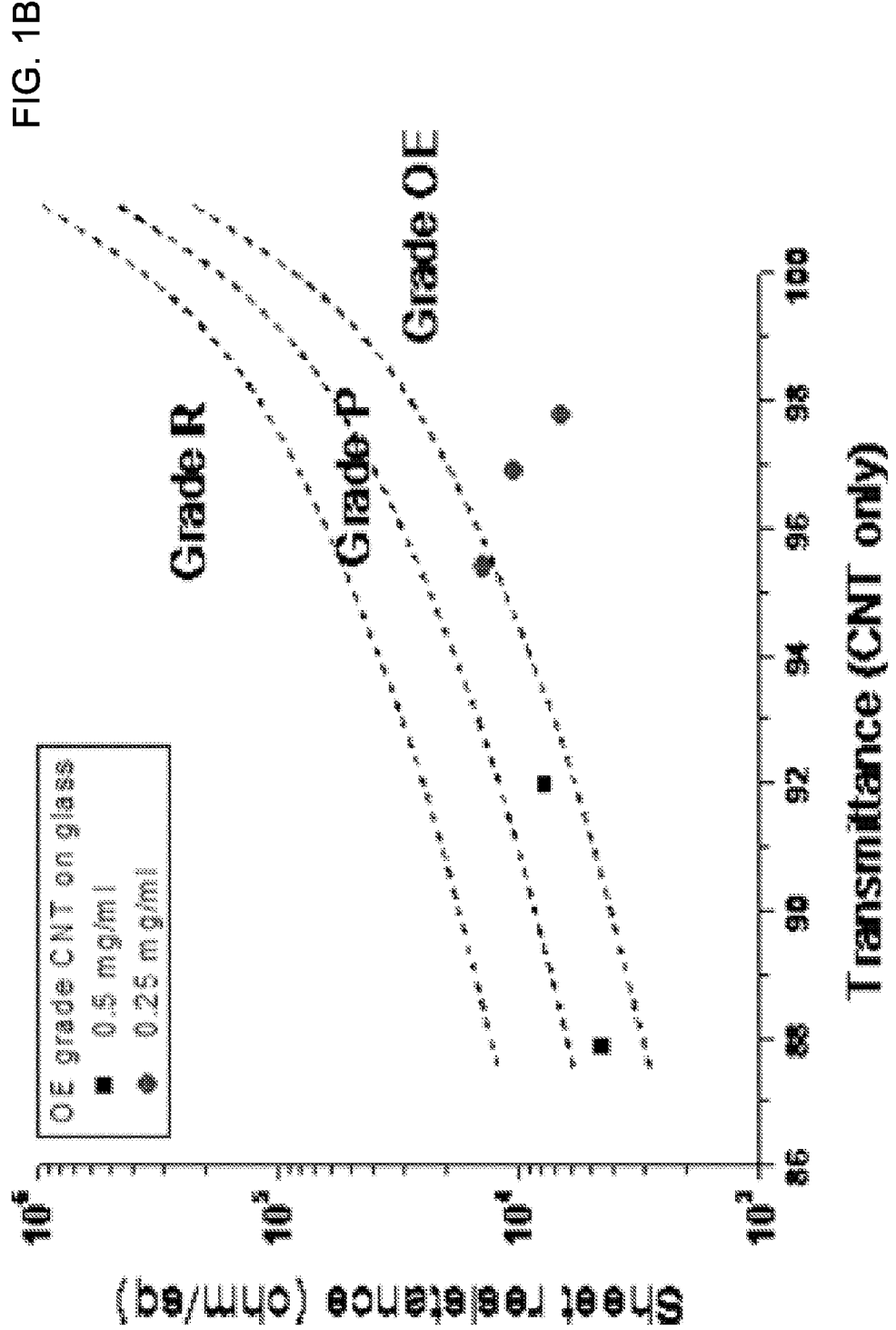
FIG. 1B is a sheet resistance versus optical transmission plot for nanostructure films fabricated from different grades and concentrations of carbon nanotubes.

In exemplary embodiment, the nanostructure film comprises an interconnected network of carbon nanotubes. Referring to FIG. 1B, projections indicate that such films may exhibit very high transparency (e.g., greater than 98%) while meeting the requisite sheet resistance specifications. Unidym OE grade nanotubes typically comprise CVD-grown FWNTs. Films comprised thereof were fabricated by dispersing the nanotubes with Triton-X surfactant, and slot-die coating the dispersions onto a glass substrate (e.g., SUB2). The resulting nanostructure film may be subsequently coated with an adhesive for bonding the polarizer plate POL2 to the glass substrate SUB2.

Figure 4:
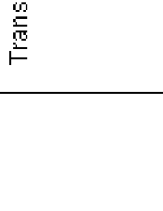
FIG. 4 is a schematic representation of exemplary IPS LCD device electrode configurations with which the present invention is compatible.

In one embodiment, other conductive elements of the IPS LCD device may comprise nanostructure films, for example the pixel electrodes, counter electrodes, source electrodes and drain electrodes. Fabrication of LCD pixel electrodes is described in co-pending U.S. application Ser. No. 11/778,535, filed Jul. 16, 2007 and entitled "Transparent and Conductive Nanostructure-Film Pixel Electrode and Method of Making the Same," which is incorporated herein by reference. Referring to FIG. 4, nanostructure-film pixel electrodes and counter electrodes may be patterned in accordance with various IPS designs such as, for example, S-TFT, S—IPS, AS-IPS and IPS-Pro.

In one embodiment, semiconducting elements of the IPS LCD device may comprise nanostructure films, for example the semiconducting channel of the thin-film transistors (TFTs) in an active matrix IPS LCD device. Fabrication of nanostructure-film TFTs is described in U.S. application Ser. No. 10/431,963, filed May 8, 2003 and entitled "Electronic Sensing of Biomolecular Processes," which is incorporated herein by reference.

Referring to FIGS. 5A and 5B, nanostructure films may be employed between other layers in LCD devices according to embodiments of the present invention. For example, nanostructure films may be deposited between or otherwise adjacent to any of the exemplary top substrate (FIG. 5A) and/or bottom substrate (FIG. 5B) LCD device layers depicted (e.g., between a TAC and Polarizing Layer), serving a shielding function against static electricity. The nanostructure film may be combined with and/or coated with an adhesive. Additionally or alternatively, the nanostructure film may form a part of one or more of the depicted layers (e.g., nanotubes may be incorporated into the Polarizing Layer).

In addition to IPS LCD devices, the nanostructure film of the present invention is applicable to other device architectures (e.g., twisted nematic (TN), vertical alignment (VA), multi-domain vertical alignment (MVA), patterned vertical alignment (PVA), etc.). Note, certain architectures will incorporate layers not depicted in FIGS. 5A and 5B (e.g., wide-viewing angle layer), however nanostructure films according to the present invention may nonetheless be incorporated in the presence of such not-depicted layers.

The present invention has been described above with reference to preferred features and embodiments. Those skilled in the art will recognize, however, that changes and modifications may be made in these preferred embodiments without departing from the scope of the present invention.

What is claimed is:

1. An LCD device, comprising:
a housing including,
a lower polarizer plate,
a liquid crystal layer on the lower polarizer plate,
an electrically conductive and optically transparent nanostructure film on the liquid crystal layer, and
an upper polarizer plate on the nanostructure film, wherein
the nanostructure film is electrically connected to the housing, and
the nanostructure film is deposited adjacent to or forms a part of at least one of a) a layer comprising triacetyl cellulose (TAC), b) the upper polarizing layer, c) an adhesive layer, d) a protective layer, e) an anti-glare layer f) an anti-reflective layer, and g) an antistatic layer.

2. The LCD device of claim 1, wherein the nanostructure film serves a shielding function against static electricity.

3. A device comprising:
a) an in plane switching (IPS) liquid crystal display (LCD);
b) a nanostructure film, wherein the nanostructure film is electrically conductive, and
wherein the nanostructure film is optically transparent, and the nanostructure film is between an upper polarizer plate and a transparent substrate.

4. The device of claim 3, wherein the nanostructure film serves a shielding function against static electricity.

5. The device of claim 3, wherein the nanostructure film is on a surface of a transparent substrate.

6. The device of claim 3, wherein the nanostructure film has a resistance of less than $2\times10^{14}$ ohms per square.

7. The device of claim 3, wherein the nanostructure film has a resistance of less than $2\times10^{8}$ ohms per square.

8. The device of claim 3, wherein the nanostructure film is embedded in an adhesive.

9. The device of claim 3, wherein the nanostructure film is patterned.

10. The device of claim 3, wherein nanostructures of the nanostructure film are aligned.

11. The device of claim 3, wherein nanostructures of the nanostructure film provide an optical polarizing effect.

12. The device of claim 1, wherein the upper polarizer plate comprises the nanostructure film, and nanostructures of the nanostructure film provide an optical polarizing effect.

13. The device of claim 3, further comprising:
a pixel electrode, and
a counter electrode, wherein the pixel electrode, the counter electrode, or both, comprises the nanostructure film.

14. The device of claim 3, wherein the nanostructure film further comprises a dopant.

15. The device of claim 14, wherein the dopant is selected from the group consisting of Iodine ($I_2$), Bromine ($Br_2$), polymer-supported Bromine ($Br_2$), Antimony pentafluoride ($SbF_5$), 2,1,3-Benzoxadiazole-5-carboxylic acid, 2-(4-Biphenylyl)-5-phenyl-1,3,4-oxadiazole, 2,5-Bis-(4-aminophenyl)-1,3,4-oxadiazole, 2-(4-Bromophenyl)-5-phenyl-1,3,4-oxadiazole, 4-Chloro-7-chlorosulfonyl-2,1,3-benzoxadiazole, 2,5-Diphenyl-1,3,4-oxadiazole, 5-(4-Methoxyphenyl)-1,3,4-oxadiazole-2-thiol, 5-(4-Methylphenyl)-1,3,4-oxadiazole-2-thiol, 5-Phenyl-1,3,4-oxadiazole-2-thiol, 5-(4-Pyridyl)-1,3,4-oxadiazole-2-thiol, Methyl viologen dichloride hydrate, Fullerene-C60, N-Methylfulleropyrrolidine, N,N'-Bis(3-methylphenyl)-N,N'- diphenylbenzidine, Triethylamine (TEA), Triethanolanime (TEA)-OH, Trioctylamine, Triphenylphosphine, Trioctylphosphine, Triethylphosphine, Trinapthylphosphine, Tetradimethylaminoethene, Tris(diethylamino)phosphine, Pentacene, Tetracene, N,N'-Di-[(1-naphthyl)-N,N'-diphenyl]-1,1'-biphenyl)-4,4'-diamine sublimed grade, 4-(Diphenylamino)benzaldehyde, Di-p-tolylamine, 3-Methyldiphenylamine, Triphenylamine, Tris[4-(diethylamino)phenyl]amine, Tri-p-tolylamine, Acradine Orange base, 3,8-Diamino-6-phenylphenanthridine, 4-(Diphenylamino) benzaldehyde diphenylhydrazone, Poly(9-vinylcarbazole), Poly(1-vinylnaphthalene), Triphenylphosphine, 4-Carboxybutyl)triphenylphosphonium bromide, Tetrabutylammonium benzoate, Tetrabutylammonium hydroxide 30-hydrate, Tetrabutylammonium triiodide, Tetrabutylammonium bis-trifluoromethanesulfonimidate, Tetraethylammonium trifluoromethanesulfonate, Oleum ($H_2SO_4$—$SO_3$), Triflic acid and Magic Acid.

16. The device of claim 14, wherein the dopant is covalently bonded to the film.

17. The device of claim 14, wherein the dopant is non-covalently bonded to the film.

18. The device of claim 14, wherein the dopant is bonded to the film in conjunction with a stabilizer.

19. The device of claim 18, wherein the stabilizer is a Lewis acid and the dopant is a Lewis base.

20. The device of claim 18, wherein the stabilizer is a Lewis base and the dopant is a Lewis acid.

21. The device of claim 18, wherein the stabilizer is a molecule selected from the group consisting of poly(4-vinylpyridine) and tri-phenyl amine.

22. The device of claim 3, wherein the nanostructure film is coated with at least one encapsulation layer.

23. The device of claim 22, wherein the encapsulation layer is a polymer selected from the group consisting of a fluoropolymer, an acrylic, a silane, a polyimide, a polyester and a polyvinylalkyl vinyl ether.

24. The device of claim 3, wherein the nanostructure film is coated film coated with two or more encapsulation layers.

25. The device of claim 24, wherein the encapsulation layer is a polymer selected from the group consisting of a fluoropolymer, an acrylic, a silane, a polyimide, a polyester and a polyvinylalkyl vinyl ether.

26. The device of claim 3, wherein the nanostructure film comprises an application-specific additive.

27. The device of claim 26, wherein the application specific additive is an infrared absorber or an ultraviolet absorber.

28. The device of claim 3, wherein the nanostructure film is on a transparent substrate, wherein the substrate is selected from the group consisting of a glass, an elastomer and a plastic.

29. The device of claim 3, wherein the nanostructure film is on a transparent substrate, wherein the substrate is an elastomer selected from the group consisting of saturated rubbers, unsaturated rubbers, thermoplastic elastomers (TPE), thermoplastic volcanizates (TPV), polyurethane rubber, polysulfide rubber, resilin and elastin.

30. The device of claim 3, wherein the nanostructure film is on a transparent substrate, wherein the substrate is a plastic selected from the group consisting of polymethyl methacrylate (PMMA), polyolefin, polyethylene terephthalate (PET), polyethylene naphthalate (PEN), polycarbonate (PC) and polyethersulfone (PES).

31. The device of claim 3, further comprising a semiconducting element comprising the nanostructure film.

32. A liquid crystal display (LCD) device, comprising:
a housing including,
a lower polarizer plate,
a liquid crystal layer on the lower polarizer plate,
a nanostructure film and an adhesive on the liquid crystal layer, the adhesive permeating the nanostructure film to form a nanostructure-adhesive composite, the nanostructure-adhesive composite being optically transparent and electrically conductive, the nanostructure-adhesive composite being electrically connected to the housing, and
an upper polarizer plate on the nanostructure-adhesive composite.

33. The LCD device of claim 32, wherein the LCD device has a device architecture selected from the group consisting of twisted nematic (TN), vertical alignment (VA), multi-domain vertical alignment (MVA), and patterned vertical alignment (PVA).

34. A LCD device, comprising:
a housing including,
a lower polarizer plate,
a liquid crystal layer on the lower polarizer plate,
a nanostructure film on the liquid crystal layer, and
an upper polarizer plate on the nanostructure film, wherein
the nanostructure film is electrically conductive and optically transparent,
the nanostructure film is electrically connected to the housing, and
the LCD device has a device architecture selected from the group consisting of twisted nematic (TN), vertical alignment (VA), multi-domain vertical alignment (MVA), and patterned vertical alignment (PVA).

* * * * *